United States Patent [19]

Yoshinaga et al.

[11] Patent Number: 4,946,642
[45] Date of Patent: Aug. 7, 1990

[54] APPARATUS FOR HANDLING A MEASURING INSTRUMENT FOR THE INSIDE OF A NUCLEAR REACTOR

[75] Inventors: Isao Yoshinaga; Toshikazu Edashima, both of Kobe, Japan

[73] Assignee: Mitsubishi Denki Kabushiki Kaisha, Japan

[21] Appl. No.: 260,320

[22] Filed: Oct. 20, 1988

[30] Foreign Application Priority Data

Jan. 20, 1988 [JP] Japan .................................. 63-8226

[51] Int. Cl.⁵ ............................................ G21C 17/00
[52] U.S. Cl. .................................... 376/260; 376/245; 254/317
[58] Field of Search ............... 376/260, 245, 254, 255, 376/227; 254/317, 312, 294; 212/142; 187/11, 27; 60/905

[56] References Cited

U.S. PATENT DOCUMENTS

| | | | |
|---|---|---|---|
| 1,447,778 | 3/1923 | Hale | 254/312 |
| 3,063,679 | 11/1962 | Nusbaum | 254/317 |
| 3,244,404 | 4/1966 | Bender | 254/317 |
| 3,642,049 | 2/1972 | Lyman | 254/317 |

FOREIGN PATENT DOCUMENTS 56-20462  5/1981  Japan .

Primary Examiner—Daniel D. Wasil
Attorney, Agent, or Firm—Leydig, Voit & Mayer

[57] ABSTRACT

A handling apparatus for a measuring instrument for the inside of a nuclear reactor has a pair of take-up drums each having a wire rope wrapped around it. A measuring instrument is secured to one end of each of the wire ropes. Each take-up drum rotates together with a corresponding drive wheel to raise or lower the measuring instrument by means of the cable. The take-up drums and the drive wheels are connected to a single motor by a gearbox equipped with a clutch which enables power to be selectively transmitted to either of the take-up drums and the corresponding drive wheel.

1 Claim, 1 Drawing Sheet

APPARATUS FOR HANDLING A MEASURING INSTRUMENT FOR THE INSIDE OF A NUCLEAR REACTOR

BACKGROUND OF THE INVENTION

This invention relates to an apparatus for handling a measuring instrument which measures some characteristic of the inside of a nuclear reactor.

During the operation of a nuclear reactor, it is necessary to lower various measuring instruments into the reactor. A conventional apparatus for handling such measuring instruments employs a motor-driven take-up drum having a wire wrapped around it, and the measuring instrument which is to be lowered into the reactor is connected to the end of the wire rope. For example, Japanese Utility Model Publication No. 56-20462 (1981) discloses a handling apparatus for nuclear instrumentation employing a take-up drum which is driven by an electric motor. However, with this arrangement, each measuring instrument which needs to be handled requires a separate motor for the corresponding take-up drum. When there are a plurality of measuring instruments to be handled, a corresponding number of motors must be employed, and thus the conventional handling apparatus has the problem of being both expensive and bulky.

SUMMARY OF THE INVENTION

Accordingly, it is an object of the present invention to provide an apparatus for handling a measuring instrument for the inside of a nuclear reactor which can handle two measuring instruments with a single motor, thereby achieving reductions in space and cost.

A handling apparatus in accordance with the present invention comprises a pair of take-up drums, a pair of wire ropes, and a pair of drive wheels. Each of the wire ropes has one end wrapped around one of the take-up drums and the other end connected to a measuring instrument for the inside of the nuclear reactor. Each drive wheel is positioned between the measuring instrument and a take-up drum and drivingly engages one of the wire ropes. The apparatus further comprises a motor and a selector mechanism coupled between the motor, the drive wheels, and the take-up drums for selectively rotating either of the take-up drums one at a time together with the corresponding drive wheel. The selector mechanism includes a gear box which has two output shafts and which is connected to the motor so as to be driven thereby and a clutch which selectively rotates one of the output shafts of the gear box. A selector mechanism further includes a mechanism for transmitting the rotation of each of the output shafts of the gear box to one of the take-up drums in the corresponding drive wheel.

Thus, in the apparatus of the present invention, each take-up drum together with the corresponding drive wheel can be selectively driven by a single motor through the selector mechanism. As a result, only a single motor is required to drive the two take-up drums and a great savings of space and cost can be achieved.

BRIEF DESCRIPTION OF THE DRAWINGS

In the figures, the same reference numerals indicate the same or corresponding parts.

DESCRIPTION OF THE PREFERRED EMBODIMENTS

Figure 1:
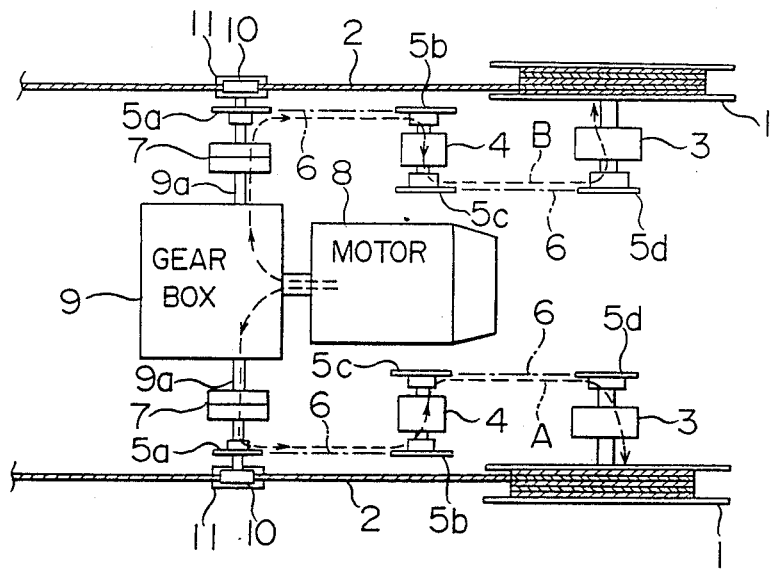
FIG. 1 is a plan view of the main portions of an embodiment of a handling apparatus in accordance with the present invention.
Figure 2:
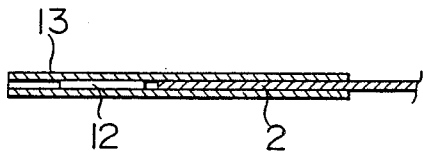
FIG. 2 is a cross-sectional view showing the left end of one of the wire ropes of the embodiment of FIG. 1.

A preferred embodiment of a handling apparatus in accordance with the present invention will now be described while referring to the accompanying drawings. As shown in FIG. 1, which is a plan view of the main portions of this embodiment, two take-up drums 1 are disposed in parallel with one another. Each take-up drum 1 has a wire rope 2 wrapped around it, and as shown in FIG. 2, the left end of each wire rope 2 is secured by welding or other means to a measuring instrument 12 such as a neutron flux detector which measures some characteristic of the inside of an unillustrated nuclear reactor. The left end of the wire rope 2 and the measuring instrument 12 pass through a stainless steel pipe 13 which extends into the inside of the reactor. The measuring instruments can be raised and lowered into the reactor by the rotation of the take-up drums 1.

Figure 3:
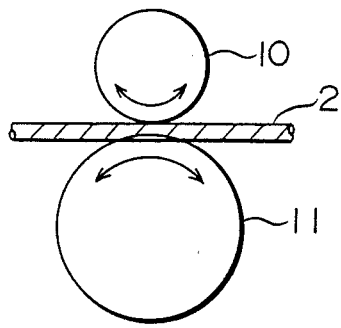
FIG. 3 is a side view of one of the drive wheels and the corresponding restraining wheel of the embodiment of FIG. 1.

A drive motor 8 has an output shaft which is connected to a gear box 9. The gear box 9 houses a reduction gear which is connected to two output shafts 9a which can be selectively driven one at a time by the motor 8 through an unillustrated electrical or mechanical clutch which is housed within the gearbox 9. Each of the output shafts 9a is connected to a drive wheel 11 through a slip clutch 7. Each of the drive wheels 11 has unillustrated gear teeth formed on its outer surface which can engage with the helical strands of the wire rope 2 so as to transmit force to the wire rope 2 without slipping. As shown in FIG. 3, which is a side view of one of the drive wheels 11, each of the wire ropes 2 passes over one of the drive wheels 11 and is pressed against the drive wheel 11 by a restraining wheel 10, which prevents the wire rope 2 from separating from the drive wheel 11 when the drive wheel 11 is rotated. A first sprocket 5a is mounted on a shaft which connects each slip clutch 7 with the corresponding drive wheel 11 so that the first sprocket 5a and the drive wheel 11 rotate together.

Each of the first sprockets 5a is connected by a chain 6 to a second sprocket 5b which is mounted on the input shaft of a reduction gear 4. A third sprocket 5c is mounted on the output shaft of each of the reduction gears 4 and is connected by a chain 6 to a fourth sprocket 5d. Each of the fourth sprockets 5d is connected to one of the take-up drums 1 through a conventional shock-absorbing coupling 3. The coupling 3 absorbs shocks caused by differences in the speed at which the wire rope 2 is drawn over the drive wheel 11 and the speed at which the take-up drum 1 attempts to take up the wire rope 2. Japanese Published Unexamined Utility Model Application No. 56-20462 discloses a shock-absorbing coupling of this type which may be employed in the present invention.

Power is selectively transmitted from the motor 8 to either of the drive wheels 11 and the corresponding take-up drums 1 along the paths indicated by the dashed lines A and B in FIG. 1. Namely, power is transmitted from the motor 8 to the gearbox 9, and from one of the output shafts 9a of the gearbox 9 to the corresponding first sprocket 5a and drive wheel 11 through the slip clutch 7. The slip clutch 7 enables the shaft on which the first sprocket 5a and the drive wheel 11 are mounted to slip with respect to the output shaft 9a of the gearbox 9 when the torque on the slip clutch 7 exceeds a certain value. Therefore, if the measuring instrument 12 hits an obstruction which prevents its movement, the slip clutch 7 will slip and prevent excessively large forces from being applied to the wire rope 2 or the measuring instrument 12 by the motor 8, thereby protecting them from damage.

The rotation of the first sprocket 5a is transmitted to the second sprocket 5b by a chain 6, and after being reduced in speed by the reduction gear 4, the rotation is transmitted to the take-up drum 1 by the third sprocket 5c, the fourth sprocket 5d, and the shock-absorbing coupling 3.

The motor 8 can be driven in either forward or reverse so that the measuring instruments 12 can be either raised from or lowered into the nuclear reactor.

It can be seen that in accordance with the present invention, two separate take-up drums 1 can be operated by means of a single motor 8, resulting in significant reductions in cost and space.

What is claimed is:

1. An apparatus for handling a measuring instrument for the inside of a nuclear reactor comprising:
   a pair of take-up drums;
   a pair of wire ropes, each of which has one end wrapped around one of said take-up drums and the other end connected to a measuring instrument for the inside of a nuclear reactor;
   a pair of drive wheels which are disposed between the measuring instruments and said take-up drums, each of said drive wheels corresponding to one of said take-up drums, and being drivingly engaged with one of said wire ropes; and
   a motor; and
   selector means coupled between the motor, the drive wheels, and the take-up drums for selectively rotating either of said take-up drums one at a time together with the corresponding drive wheel, said selector means including a gear box which has two output shafts and which is connected to the motor so as to be driven thereby, clutch means for selectively rotating one of the output shafts of the gear box, and means for transmitting the rotation of each of the output shafts of the gear box to one of the take-up drums and the corresponding drive wheel.

* * * * *